Patented June 17, 1952

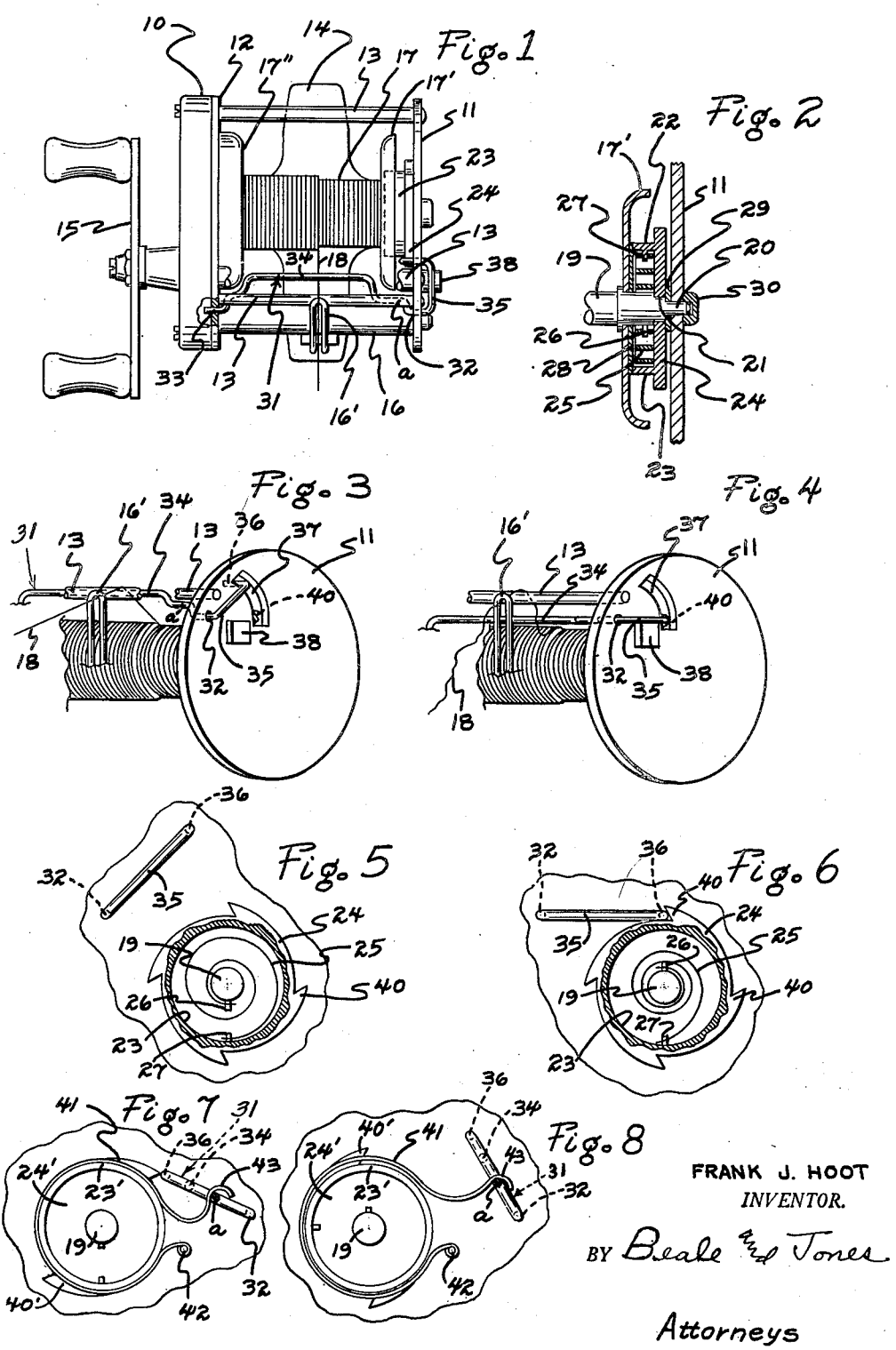

2,601,021

UNITED STATES PATENT OFFICE 2,601,021

ANTIBACKLASH REEL

Frank J. Hoot, Tulsa, Okla.

Application July 18, 1950, Serial No. 174,400

8 Claims. (Cl. 242—84.5)

This invention pertains to fishing reels and more particularly to improvements in means for automatically preventing unwinding of the line from the spool of the reel, whenever there is no tension on the line.

This invention is particularly adaptable to reels which are used for casting to prevent so called backlash of the reel when the cast is completed or the line stops at any distance out from the reel.

The principal object of this invention is to provide an anti-backlash mechanism that is free of tension or friction on the reel, thereby permitting a longer cast.

Another object of the invention is to provide an anti-backlash mechanism that has a minimum of working parts and is automatic in operation.

A further object of the invention is to provide in an anti-backlash mechanism a sensing element or line bail that is not acted upon by spring means to detect tension and slackness in the line leading from the reel and at the same time acts as a direct operator to arrest the rotation of the reel when the line becomes slack.

A still further object of the present invention is to provide in an anti-backlash mechanism a ratchet wheel that is rotatably mounted on the reel or spool and has a biasing spring connected at one end to the spool and at the other end to the ratchet wheel to act as a brake to stop the rotation of the reel when the ratchet wheel is prevented from rotating by action of the line bail when the line becomes slack.

Another object of the invention is to provide in a reel a first means for retarding the rotation of the reel in response to slackness in a line leading from the reel and a second means for preventing rotation of the reel in response to slackness in the line leading from the reel, said first and second means being adapted to act in sequence or simultaneously.

Another object of the present invention is to provide in an anti-backlash mechanism for a reel, a drum which is spring biased to the reel with the drum having ratchet teeth and a brake band portion, a brake band which is normally tensioned to engage the brake band portion and a line bail which is pivoted in the frame of the reel and operably responsive to a condition of the line leading from the reel having portions on the bail which are adapted to engage the brake band and the ratchet teeth, whereby upon the line being tensioned the line bail is pivotally held so that it holds the brake band from engagement with the drum and when the line is slack the bail permits the brake band to engage its brake band portion to retard the rotation of the drum and reel and a portion of the line bail also engages a ratchet tooth to stop the rotation of the drum and reel.

A still further object of the invention is to provide an anti-backlash mechanism that has a minimum of simple working parts that will not get out of order and are not affected by dirt, dampness or water, yet are economical to manufacture and assemble.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

The invention is illustrated in the accompanying drawing, wherein:

Figure 1 is a side elevation of a reel in which is incorporated the line bail, the drum with ratchet wheel portion and its connection to the reel in accordance with my invention;

Figure 2 is a detailed fragmentary side view showing the drum and its ratchet wheel portion rotatably mounted on the end of the reel and its spring bias connection to the reel;

Figure 3 is a fragmentary perspective view illustrating the line bail operator held by the tensioned fishing line in a pivotal position wherein its ratchet wheel engaging portion is held out of engagement with the ratchet wheel portion of the rotatably mounted drum;

Figure 4 is a view similar to that of Figure 3 wherein the fishing line leading from the reel is slack and the line bail is permitted to pivot in a clockwise direction so that its ratchet wheel engaging portion is in engagement with a ratchet wheel portion;

Figure 5 is a diagrammatic end view showing the ratchet wheel portion with the central end portion broken away to illustrate its spring biasing connection to the spindle of the reel with the ratchet wheel engaging portion of the line bail pivoted out of engagement with the ratchet wheel when in the tensioned line condition as shown in Figure 3;

Figure 6 is a view similar to that of Figure 5 but showing the ratchet wheel engaging portion of the line bail in operative engagement with a ratchet tooth on the ratchet wheel as occurs when the line bail is permitted to pivot when the fishing line is slack as illustrated in Figure 4;

Figure 7 illustrates a modification in my antibacklash mechanism which includes a resilient brake band encircling a drum having two teeth on its ratchet wheel portion with the band in braking engagement with the drum and an operating portion on the line bail in cooperating engagement with a free end of the brake band; and Figure 8 is a view similar to Figure 7 but showing the condition of the resilient brake band held out of engagement with the drum by the line bail when the line bail is held in a pivoted position away from the axis of the reel when the fishing line such as in Figure 3 is in a taut condition.

Throughout the various figures in the drawing like reference characters refer to corresponding parts.

I have illustrated in Figure 1 a customary fishing line reel as generally indicated at 10 having a frame comprising end housings 11 and 12, cross struts 13 and a mounting bracket 14. The reel also includes the customary reel hand crank generally indicated at 15 and traversing mechanism generally indicated at 16 and 16'. Mounted in the frame is a reel proper 17 having ends 17' and 17'' and a fishing line 18 reeled thereon and extending therefrom.

Referring to Figure 2 there is illustrated a spindle 19 for the reel 17 with the right hand end 17' of the reel shown. Spindle 19 is journaled at 20 in the right hand end housing 11 while the left hand end is similarly journaled (but not shown) in the left hand end housing 12. In accordance with my invention spindle 19 is provided with a shouldered concentric circular bearing portion 21 on which I rotatably mount a drum generally indicated at 22 having a somewhat cup shape which extends inwardly as a drum portion at 23 while the portion 24, in rotary engagement with the spindle 19, I term its ratchet wheel portion. A coiled spring 25 is connected at its inner end to a lug 26 on spindle 19 while its outer end is connected to the drum generally indicated at 22 by means of a lug 27 extending inwardly from the inner periphery of the drum proper portion 23. Still referring to Figure 2, I have included in my construction an end cover plate 28 for the open end of the drum and this plate 28 is apertured at its center so as to fit over the spindle 19. Also included is a spacer washer 29 which fits over the journal portion 20 of the spindle thereby spacing the ratchet wheel portion 24 from the end housing 11. A suitable cover cap 30 is provided for the end of the journaled end 20 of spindle 19.

Referring again to Figure 1, there is illustrated according to my invention a line bail generally shown at 31 which has ends 32 and 33 pivoted respectively in suitable apertures formed in the end plates 11 and 12. The line bail 31 is of a bail shape having an intermediate portion 34 coextensive with the line receiving portion of the reel 17 and under which the traversed line 18 is led as it extends outward from the reel. Each end portion of the line bail 31 is of a somewhat crank shape form to clear the contour of the end portions 17' and 17'' of the reel 17. However, the right hand end portion as indicated at a in Figures 1, 3, 7 and 8 serves as an operating engaging portion for the brake band shown in Figures 7 and 8 to be subsequently described. The right hand end of the line bail 31 at 32 extends on to the right or outward slightly past the end housing 11, thence inwardly as viewed in Figure 1 at 35 in parallel relation to the housing 11 and lies within a plane containing the ends 32 and 33 and the intermediate portion 34. The extreme inner end 36 extends at right angles to the portion 35 and inwardly through an arcuate slot 37 formed in the end housing 11 and I term this a spool or ratchet wheel engaging portion that extends from the line bail 31. I have shown in Figures 3 and 4 an abutment plate 38 which is secured to the outer surface of the end housing 11 which serves as a stop to limit the clockwise pivotal movement of the bail portion 35 as viewed in Figures 3 and 4.

In Figures 5 and 6 there is best shown the configuration of the ratchet wheel portion 24 having four equally spaced ratchet teeth 40. The central area of the ratchet wheel portion 24 is broken away so as to depict the mounting of the flat coil spring 25 connected at 26 to reel or spool spindle 19 and at 27 to the inner periphery of the drum portion 23.

In Figure 5, the spool or ratchet wheel engaging portion 35—36 of the line bail 31 is shown out of engagement with the teeth 40 on the ratchet wheel 24 as it is held in this position by the taut line 18 as shown in Figure 3 leading from the reel as when the fishing line is paying out when casting. The flat coil spring 25 is shown expanded in biasing the ratchet wheel 24 from the reel or spool spindle 19.

Referring to Figure 6 the arrangement of the parts of Figure 5 are shown when the line bail 31 has pivoted clockwise under its own weight since the former taut line 18 of Figure 3 is now slack as shown in Figure 4 as the cast has been completed or the line advance has been stopped. The ratchet wheel engaging portion 35—36 of the line bail 31 are shown in engagement with one of the teeth 40 on the ratchet wheel 24 whereupon rotation of the ratchet wheel is stopped and spring 25 coils into a tight condition, thereby arresting the rotation of spindle 19 to which the inner end of the spring is attached. This action arrests the rotation of the reel or spool 17 and on slack occurring in line 18, the line bail 31 is responsive thereto in pivoting clockwise, as in Figure 4, to assume the position as shown in Figure 6. As soon as the momentum of the reel or spool 17 is arrested, as shown in Figure 6, the tightened spring 25 tends to resume its former uncoiled condition and in so doing spends its energy in uncoiling by causing the reel or spool 17 to rotate in the reverse direction from that of paying out line so as to reel in the line and thereby it tends to take up the slack in the line 18.

In the anti-backlash mechanism according to my invention it will be noted that the line bail is substantially free of friction except at its journal portions 32 and 33 which is negligible. This arrangement of the parts in my anti-backlash mechanism tends to put little, if any, drag on the line 18 when casting out the line, yet the line bail portion 34 which rests lightly on the taut line 18 in casting is fully responsive to the taut condition of the line to hold the spool or ratchet wheel engaging portion out of engagement with its ratchet wheel. Just as soon as the line 18 becomes slack, the line bail engaging portion 34 is responsive to the slack condition and the line bail 31 pivots as it is unsupported and the ratchet or spool engaging portion 35—36 of the bail is operably responsive to the pivotal movement of the bail toward the axis of the spool or reel.

By referring to Figures 3 and 4, it will be clearly observed that the line engaging portion 34 of the line bail 31 pivots from a position in Figure 3 which is away from the axis of the reel 17 to a position nearer to the axis of the reel 17 as shown in Figure 4, thereby making the integral portion of the line bail at 35—36 which engages the ratchet wheel, responsive to this movement of the whole line bail 31.

In Figures 7 and 8 there is disclosed an added feature which provides for incorporating a brake band generally indicated at 41. For purposes of more clearly illustrating this added braking feature, the spring 25 has been omitted from the Figures 7 and 8. In this construction the drum 20 which is rotatably mounted on spindle 19 of the reel is generally like the drum 22 in the other figures, however the ratchet wheel portion at 24' is provided with only two oppositely disposed teeth 40'. As in the previously described construction the integral drum portion 23' and ratchet wheel portion 24' are connected to the spindle 19 of the reel by the spring 25 (not shown in Figures 7 and 8).

Brake band or elongated flexible strip 41 is of resilient spring material and is anchored at one end to the frame by a suitable post or pin 42 while the other end is free and is formed with a looped portion 43 which fits over the portion a of the line bail 31 (see also Figures 1 and 3 for a showing of the portion a). The line bail 31 as previously described is pivoted at 32 and 33 with pivot 32 only shown in Figures 7 and 8. The line engaging intermediate portion is outlined at 34 and the tooth engaging portion of the line bail is outlined at 36. The brake band 41 is shown with its free end 43 unsupported by the line bail portion a in Figure 7 which is a condition when the line bail is unsupported by the line 18 when that line is slack. The brake band 41 in this condition of Figure 7 grasps the brake band portion 23' of the drum and slows down the rotation of the drum during which slowing down of rotation the tooth 40' will rotate clockwise until it is intercepted by the tooth engaging portion 36 on the line bail, whereupon the rotation of the drum and ratchet wheel will be stopped.

In Figure 8 I have shown the line bail 31 in its position when pivoted up by the taut line 18 as shown in the Figure 3 condition. In this upwardly pivoted position of the line bail, portion a thereof engages under the loop 43 and raises it so as to hold the brake band 41 away from contact with its cooperating brake band portion 23' on the drum and ratchet wheel, thus permitting free rotation of the drum, generally indicated at 22 in Figure 2, and the reel or spool 17 interconnected by the spring 25 to the drum and ratchet wheel.

In making a cast of the line using my anti-backlash mechanism the sensitive line bail 31 is pivoted away from the axis of the reel by the taut line 18 as shown in Figure 3. In this condition of the line bail the brake band 41 is held out of engagement with the brake band portion 23' as shown in Figure 8 and the reel 17 is permitted to freely rotate to pay out line 18. Now when line 18 starts to slow up in speed there is a tendency for the momentum of the rotating reel 17 to continue its rotation. By the mechanism that I have devised, this rotation of the reel 17 is first retarded then stopped and then reversed so as to prevent backlash and paying out further of the line 18 at the reel which is desired to be avoided. Firstly, the line bail tends to be unsupported at its intermediate portion 34 by the line 18 as the line is not now as taut. The line bail portion 34 approaches nearer the axis of the reel 17 and at this time its portion a moves to the position in Figure 7 where it allows the brake band 41 to engage its cooperating brake band portion 23' and slow down its rotation and in turn through the spring connection 25, as above described, the rotation of the interconnected reel or spool 17. Secondly, the tooth 40' comes into engagement with the line bail ratchet wheel engaging portion 36 and the rotation of the drum is stopped.

Thirdly, the momentum of rotation of the reel 17 then tends to wind up spring 25 in its limit and in turn the rotation of the reel 17 is stopped. Fourthly, the energy stored up in coiling of spring 25 is released to reverse the rotation of the reel 17 from what it was when paying out line 18 so as to now wind in the line 18 and take the slack out of the line.

The anti-backlash mechanism according to my invention is practically free of friction thus permitting a long cast to be made without dragging interference of the mechanism. Yet my anti-backlash mechanism is easily manufactured, is automatic in operation and will not get out of order or require adjustment.

I claim as my invention:

1. In a fishing reel having a frame including end housings and a spool journaled in the end housings, a ratchet wheel rotatably mounted on the spool, a biasing spring connected at one end to said spool and at the other end to said ratchet wheel, and a ratchet wheel engaging means movably mounted on said frame and operably responsive to changes in position of a line leading from said spool to engage said ratchet wheel and prevent rotation thereof when said line becomes slack.

2. In a fishing reel having a frame including end housings and a spool journaled in the end housings, a ratchet wheel rotatably mounted on the spool, a biasing spring connected at one end to said spool and at the other end to said ratchet wheel, a line bail pivotally mounted on said frame, said bail being adapted to be supported in a pivoted position remote from the axis of said spool by a line leading from said spool in a taut condition, and a ratchet wheel engaging portion extending from said line bail and toward said ratchet wheel, said ratchet wheel engaging portion of the bail being operably responsive to pivoted movement of said bail toward the axis of said spool when said line becomes slack to engage said ratchet wheel and prevent rotation thereof and thereby arrest the rotation of the spool.

3. In a fishing reel having a frame including end housings and a spool journaled in the end housings, a ratchet wheel rotatably mounted on the spool, a biasing spring connected at one end to the spool and at the other end to the ratchet wheel, a line bail having its ends pivotally journaled in said end housings and adapted to be supported in a pivotal position remote from the axis of said spool by a line leading from said spool in a taut condition, and a ratchet wheel engaging portion extending from one of the journaled ends of said line bail and back through an opening provided in the adjacent end housing for cooperative engagement with said ratchet wheel, said ratchet wheel engaging portion being operably responsive to pivoted movement of said bail toward the axis of said spool when the line becomes slack thereby engaging and stopping the rotation of said ratchet wheel and arresting the rotation of said spool.

4. In a fishing reel of the character described in claim 3 wherein there is included a transverse bar extending between said end housings in greater spaced relationship to the axis of said spool than said line bail for supporting said line leading from said spool.

5. In a fishing reel having a frame including end housings and a spool journaled in the end housings, said spool having a plurality of ratchet teeth extending from a peripherial portion thereof and a brake band engaging portion, a resilient brake band surrounding the brake band engaging portion of said spool and having one end anchored to said frame and the other end free, said resilient brake band normally tending to grip said brake band portion when the free end of the band is unsupported, a line bail having its ends pivotally journaled in said end housings and adapted to be supported in a pivoted position remote from the axis of said spool by a line leading from said spool in a taut condition, said line bail having a portion thereof adapted for supporting engagement with said free end of the brake band to hold it out of engagement with said brake band portion on the spool when the line leading from said spool is taut and supporting said bail, otherwise when said line is slack permitting said free end to move and the resilient band to engage and retard rotation of said spool, said line bail also having a ratchet tooth engaging portion extending from one of the journaled ends of said line bail and back through an opening provided in the adjacent end housing for cooperative engagement with said ratchet teeth on the spool, said ratchet tooth engaging portion on the bail being operably responsive to pivoted movement of said bail toward the axis of said spool when the line becomes slack thereby engaging and stopping the rotation of said spool.

6. In a fishing reel having a frame including end housings and a spool journaled in the end housings, a drum rotatably mounted on the spool and having a plurality of ratchet teeth extending from a peripherial portion thereof and a brake band engaging portion, a biasing spring connected at one end to the spool and at the other end to said drum, a resilient brake band surrounding the brake band portion of said drum and having one end anchored to said frame and the other end free, a line bail having its ends pivotally journaled in said end housings and adapted to be supported in a pivoted position remote from the axis of said spool by a line leading from said spool in a taut condition, said line bail having a portion thereof adapted for supporting engagement with said free end of the brake band to hold it out of engagement with said drum when the line leading from said spool is taut and supporting said bail, otherwise when said line is slack permitting said free end to move and the resilient band to engage and retard rotation of the drum and spool, said line bail also having a ratchet tooth engaging portion extending from one of the journaled ends of said line bail and back through an opening provided in the adjacent end housing for cooperative engagement with said ratchet teeth on the drum, said ratchet tooth engaging portion on the bail being operably responsive to pivoted movement of said bail toward the axis of said spool when the line becomes slack thereby engaging and stopping the rotation of said drum and arresting the rotation of said spool.

7. In a fishing reel having a frame including end housings and a spool journaled in the end housings, a ratchet wheel mounted on an end of said spool adjacent the inner face of one of the end housings which has an opening therein, and a line bail extending between and pivotally mounted at its ends in said end housings and adapted to be supported in a pivotal position remote from the axis of said spool by a line leading from said spool in a taut condition, said line bail having a ratchet wheel engaging portion extending from one end thereof and projecting back through said opening in the end housing adjacent thereto where the ratchet wheel engaging portion of said bail cooperatively engages with said ratchet wheel when the line becomes slack.

8. In a fishing reel having a frame including end housings and a spool journaled in the end housings, said spool having a plurality of ratchet teeth extending from a peripherial portion thereof and a brake engaging portion, an elongated flexible strip wound around the brake engaging portion of said spool and having one end anchored to said frame and the other end free, said flexible strip normally tending to grip said brake engaging portion when the free end of the strip is unsupported, a line bail having its end pivotally journaled in said end housings and adapted to be supported in a pivotal position remote from the axis of said spool by a line leading from said spool in a taut condition, said line bail having a portion thereof adapted for supporting engagement with said free end of said elongated flexible strip to hold it out of engagement with said brake engaging portion on the spool when the line leading from said spool is taut and supporting said bail, otherwise when said line is slack permitting said free end to move and the flexible strip to engage and retard rotation of said spool, said line bail also having a ratchet tooth engaging portion fixed thereto and extending therefrom for cooperative engagement with said ratchet teeth on the spool, said ratchet tooth engaging portion fixed to the line bail being operably responsive to pivotal movement of said bail toward the axis of said spool when the line becomes slack thereby engaging a tooth on said ratchet wheel and stopping the rotation of said spool.

FRANK J. HOOT.

REFERENCES CITED

The following references are of record in the file of this patent:

UNITED STATES PATENTS

| Number | Name | Date |
| --- | --- | --- |
| 1,971,470 | Watson | Aug. 28, 1934 |
| 2,272,834 | Drautz | Feb. 10, 1942 |
| 2,501,378 | Cintron | Mar. 21, 1950 |